United States Patent [19]
Sullivan

[11] Patent Number: 5,078,874
[45] Date of Patent: Jan. 7, 1992

[54] FIRE CHAMBER WATER FILTER DEVICE

[76] Inventor: John L. Sullivan, 1362 N.E. 117 St., N. Miami, Fla. 33161

[21] Appl. No.: 609,347

[22] Filed: Nov. 5, 1990

[51] Int. Cl.⁵ .............................................. B01D 24/10
[52] U.S. Cl. ..................................... 210/286; 210/305; 210/416.3; 210/460
[58] Field of Search ............... 210/207, 265, 285, 286, 210/305, 435, 460, 521, 532.1, 416.3

[56] References Cited

U.S. PATENT DOCUMENTS

| | | | |
|---|---|---|---|
| 176,593 | 4/1876 | Burke | 210/286 |
| 1,182,465 | 5/1916 | Evans | 210/286 |
| 3,208,595 | 9/1965 | Butler | 210/286 |
| 3,460,677 | 8/1969 | Fifer | 210/521 |
| 4,368,123 | 1/1983 | Stanley | 210/269 |
| 4,826,594 | 5/1989 | Sedman | 210/266 |
| 4,913,808 | 4/1990 | Hague | 210/282 |

*Primary Examiner*—Robert A. Dawson
*Assistant Examiner*—Wanda L. Millard

[57] ABSTRACT

A water filtering device connected to a low water pressure supply and having a housing with an inlet and an outlet for the water being filtered. The housing has four chambers plus a water collecting chamber that are abutting to each other and separated by baffles that each include a screened window member. Different filtering media are contained, in a predetermined order, inside the chambers and through which the water is slowly forced.

4 Claims, 2 Drawing Sheets

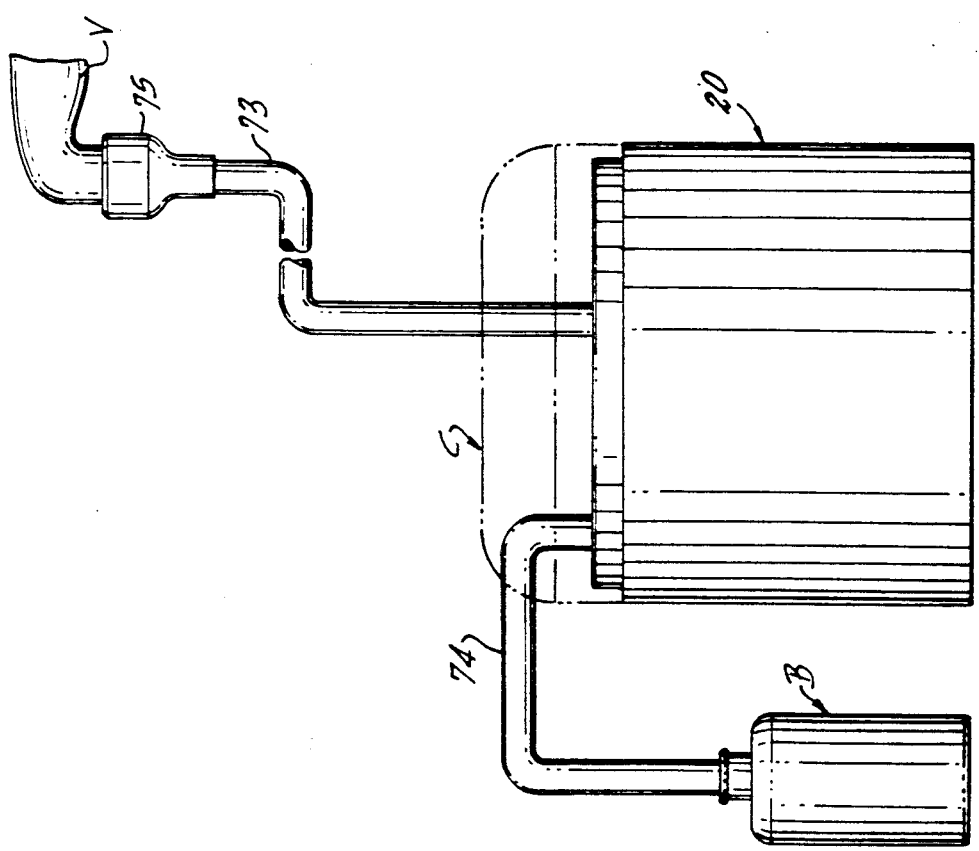
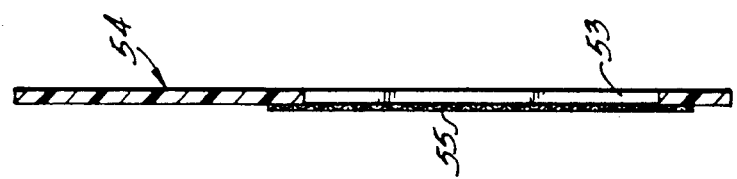
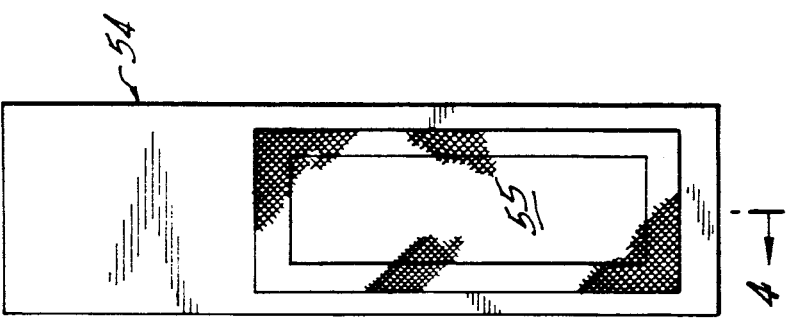

FIRE CHAMBER WATER FILTER DEVICE

BACKGROUND OF THE INVENTION

1. Field of the Invention

The present invention relates to devices for filtering potable water, and more particularly, to such devices that are of the low pressure type.

2. Description of the Related Art

A multitude of devices exist for filtering potable water and they all work with different degrees of efficiency to eliminate undesirable particles, substances, and living organisms from the water being filtered. Many of these devices, however, utilize the relatively high pressure available from the tap water supply. This necessarily rushes the water through the filtering media preventing the efficient filtering function for which the device was designed. Typically, the designer's concern for efficient filtering of the water is comprised with throughput considerations.

Applicant believes that the closest reference corresponds to U.S. Pat. No. 4,368,123 issued to Stanley and entitled Regenerative Counter Top Water Conditioner. However, it differs from the present invention because it does not provide for back-washing thereby loosing or freeing up the particles laid up against the screen members.

Another device Applicant believes to be relevant is the Subcommittee Interchangeable Cartridge Drinking Water Purification System described in U.S. Pat. No. 4,913,808 issued to Haque in 1990. This device requires the use of a high pressure water supply that is forced through the device in one direction through compacted filtering media.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device for filtering potable water that utilizes a low pressure water supply at its inlet that permits the slow interaction of the water being filtered with the different media through which it passes thereby enhancing the clinging of the undesirable material to the filtering media.

It is another object of this present invention to provide a water filtering device wherein the direction of the water flowing through it can be readily reversed therby freeing up the residue material that collects against the screen members and reclassifies or repositions the resin beads to utilize the maximum surface capabilities.

It is still another object of this invention to provide a portable filtering device that is volumetrically efficient and easy to clean.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 is an elevational view of the present invention.

FIG. 4 is a cross-sectional view of FIG. 5 taken along line 4—4.

FIG. 5 is an elevational view of a baffle member including a window.

DETAILED DESCRIPTION OF THE PREFERRED EMBODIMENT

Figure 1:
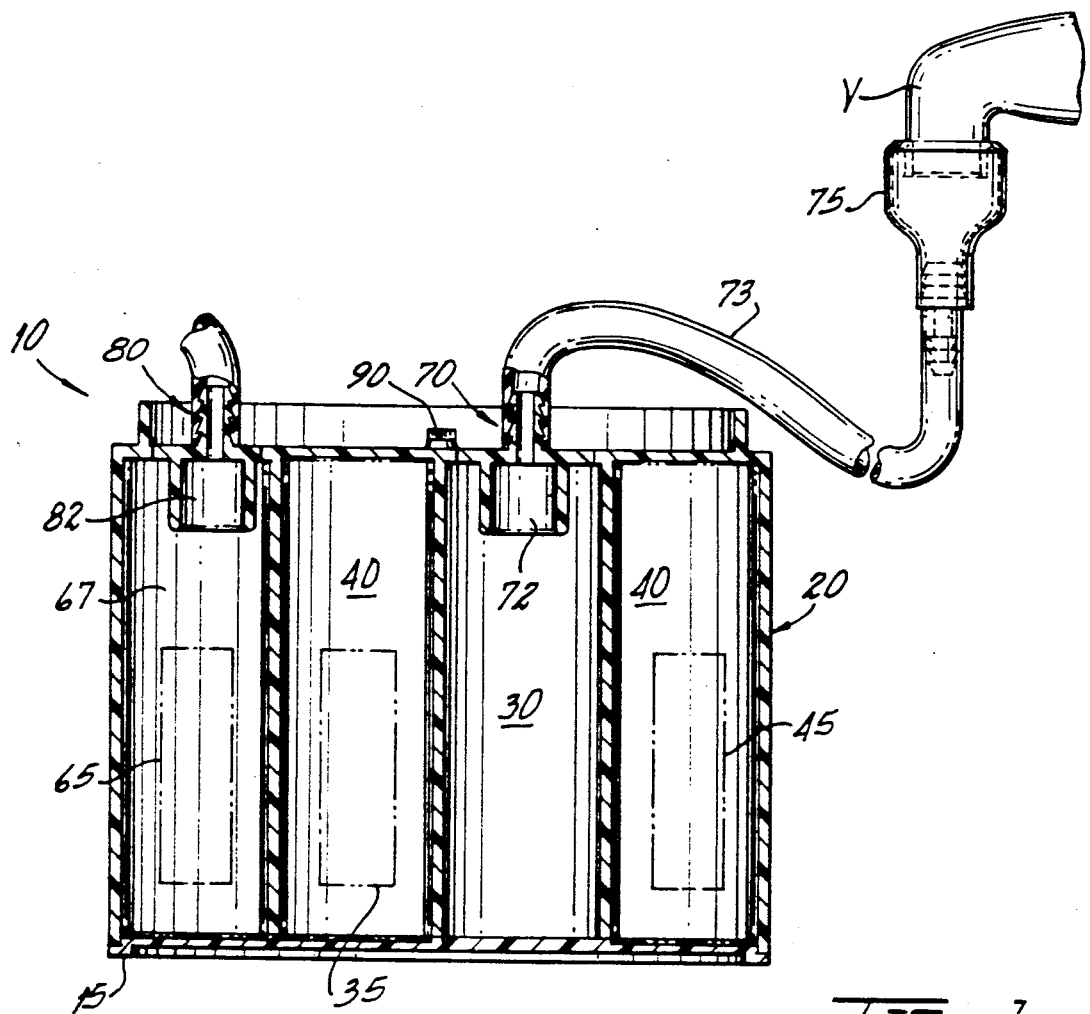
FIG. 1 shows a cross-sectional view of the device shown in FIG. 2 taken along line 1—1.
Figure 2:
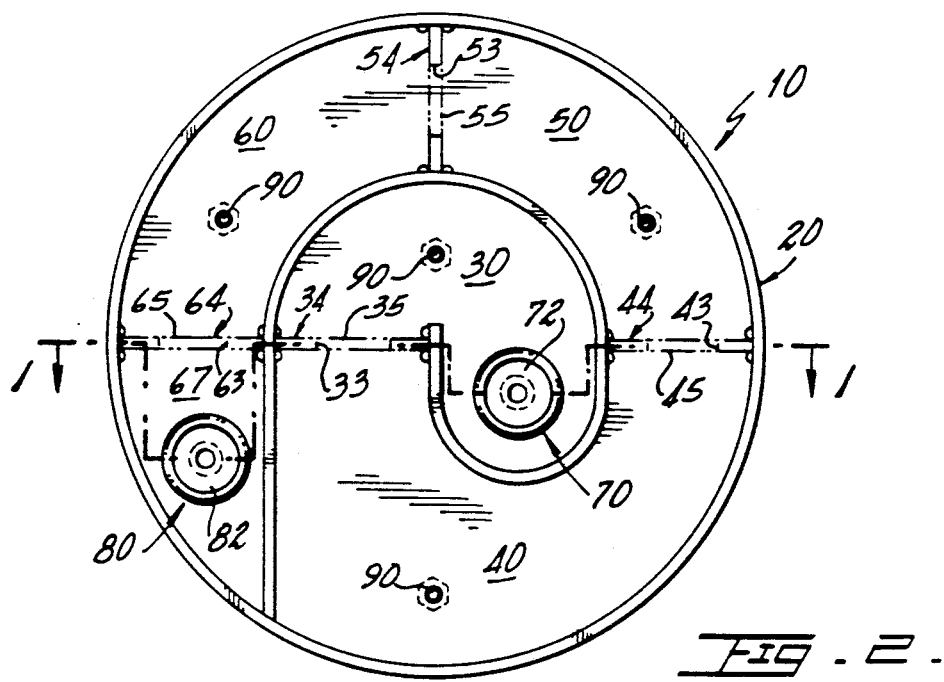
FIG. 2 represents a bottom view of one of the preferred embodiments for the present invention showing the internal disposition of its chambers.

Referring now to FIG. 1, where the present invention is generally referred to with numeral 10, it can be observed that it basically includes a housing 20 with four chambers therein 30; 40; 50 and 60. An additional chamber is referred to as water collecting chamber. Each chamber has two connecting areas for connecting themselves and also first chamber 30 with inlets assembly 70 and water collecting chamber 67 with fourth chamber 60. Bottom cover 15 is sonically welded to housing 20. Water inlet assembly 70 can be connected to a tap water supply with a valve V that permits the regulation of its pressure. Conduit member 73 connects water inlet assembly 70 through elastic connector 75. Connector 75 provides a sufficient grip around valve V to provide a water-tight engagement up to a given predetermined pressure which is preferably kept below 2.0 p.s.i. Water inlet assembly 70 includes filter member 72 connected to first chamber 30 that is preferably implemented with a Porex filter (Porex is a trademark of Porex Technologies, Inc. Atlanta, Ga.) and it acts as a preliminary filter. Water outlet assembly 80 is connected to the last chamber 60 and it also includes a filter member that is referenced with numeral 82 and it is similar to filter 72.

The above referenced chambers are separated by baffles 34; 44; 54 and 64 and they include respective screen members 35; 45; 55 and 65, typically of the 20 microns gauge. Screen members 35, 45, 55 and 65 are sonically welded to the baffles, covering openings 33; 43; 53 and 63, to seal them without affecting the material of the screen member or the separately member, which are preferably made out of a universal nylon material. The water being filtered is obtained from faucet V to which universal silicone faucet adapter 75 is removably mounted and designed to work under low pressure only. Application of excessive pressure (opening water faucet excessively) would cause the adapter to dislodge. The water coming from adapter 75 through condiut member 73 is forced into water inlet assembly 70 and downwardly into chamber 30. Chamber 30 is filled with a granular activated carbon medium which acts as a pre-filter to eliminate tri-halomethines (THM), chloroform, chlorine, pesticides and organic matter by adsorption. Then the water goes through first screen member 35 of baffle 34 into chamber 40. Inside chamber 40, the water is forced through another filter medium that is preferably filled with a mixed bed ion exchange resin (water softener) to remove calcium, a manganese and dissolved salts.

From chamber 40, the water is forced through screen window member 45 of baffle 44 and into chamber 50. Chamber 50 is filled with bacterio-static carbon which is a silver impregnated carbon used to inhibit bacteria growth.

From chamber 50, the water continues to travel towards baffle 54 and passes through screen window 55 into chamber 60 which is filled with a cations exchange resin. This resin eliminates any remaining taste or odor caused primarily by amino compounds. Any trace of metals given off by the silver from chamber 50 will be adsorbed by the cation resin. Finally, the water goes through screen window 65 into water collecting chamber 67 which is empty, except for the water collected.

The order in which the water being filtered is exposed to the different filtering media is important for its effectiveness. For example, the chlorine must be removed first in order to avoid damage to the mixed bed resin. Also, the cation exchange resin must come after the silver impregnated carbon media.

With this structural combination the present invention permits a user to back wash the unit thereby freeing up the residue material that would have collected against the screen and the resulting slurry can be moved around inside the chambers. Backwashing is a very important feature since it serves to remove particulate matter, eliminates gas, pockets, reclassifies or redistributes the resin beads and removes resin fines. This is so because the abutting surfaces of the resin is consequently exposed to its fullest surface capacity. Then periodically and typically every 12-15 months, a user can replace the filtering media completely by removing plugs 90 at the top 24 of housing 20, and in this way the chambers are flushed out and new filtering media inserted. There is one plug for each chamber except water collecting chamber 67.

One of the inherent advantages of this device is that it can be readily detached from a faucet and stored in a refrigerator thereby delaying or minimizing bacteria growth in the unit.

Cap C is used to cover water filtering device 10 when stored or in transportation. Bottle B is used to collect the filtered water. This is best shown in FIG. 3.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A water filtering device removably connected to a supply of low pressure water, comprising:

A. a housing having five contiguous chambers separated by baffle each having a screen window member and said chambers being referred to as first chamber, second chamber, third chamber; and fourth chamber and water collecting chamber and wherein said first chamber is connected to said second chamber through one of said screen window members and said first chamber containing granular activated carbon means for filtering, said second chamber being also connected to said third chamber through another one of said screen window members and said second chamber containing mixed bed ion exchange resin means for filtering and said third chamber is also connected to said fourth chamber through another one of said screen window members and said third chamber containing silver impregnated carbon means for filtering which is also connected to said water collecting chamber through another one of said screen window members and said fourth chamber containing cation exchange resin means for filtering;

B. an inlet water assembly having two ports, one of said ports being connected to said supply and the other port to said first chamber and said inlet water assembly further including pre-filtering means containing said granular activated carbon means for filtering inside said first chamber;

C. an outlet water assembly having two ports and one of said ports being connected to said water collecting chamber and the other port provides the filtered water to a user; and D. faucet adapter means for limiting the magnitude of the water pressure applied to said water inlet assembly so that backwashing permits the removal of particulate matter and redistribution of the resin within said chambers.

2. The water filtering device set forth in claim 1 wherein said first, second, third and fourth chambers includes one plug member each so that the means for filtering contained in said chambers can be readily replaced.

3. The water filtering device set forth in claim 2 wherein said screen window members include a mesh of 20 microns thereby preventing any particulate matter of larger dimensions through.

4. The water filtering device set forth in claim 3 wherein said outlet water assembly includes means for filtering to prevent the entry of any extraneous body into said device.

* * * * *

UNITED STATES PATENT AND TRADEMARK OFFICE
CERTIFICATE OF CORRECTION

PATENT NO. : 5,078,874

DATED : January 7, 1992

INVENTOR(S) : John L. Sullivan

It is certified that error appears in the above-identified patent and that said Letters Patent is hereby corrected as shown below:

On the title page, in item [54] and in col. 1, line 2, "FIRE" should read --FIVE--.

Signed and Sealed this

Twenty-third Day of March, 1993

Attest:

STEPHEN G. KUNIN

Attesting Officer

Acting Commissioner of Patents and Trademarks